UNITED STATES PATENT OFFICE.

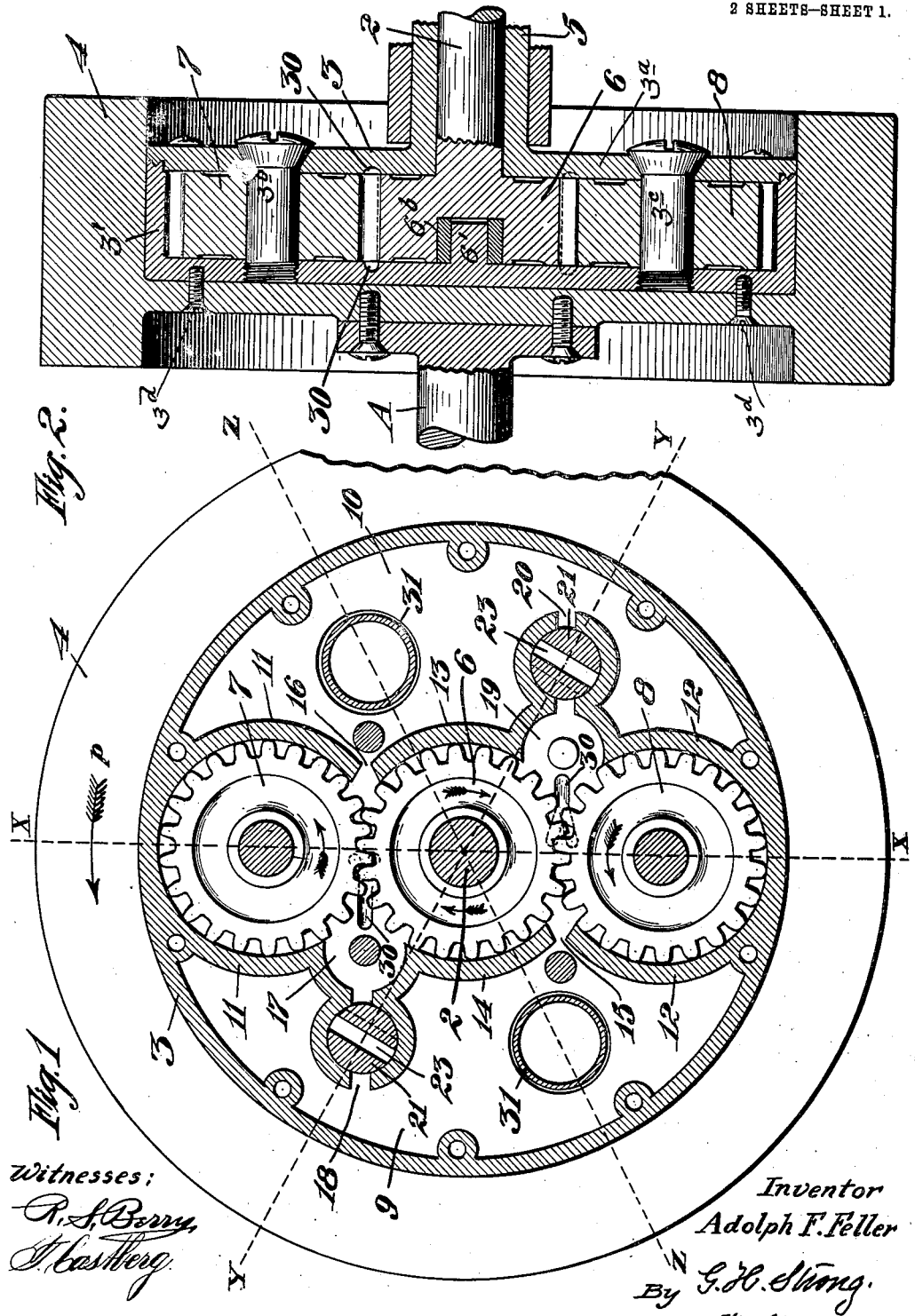

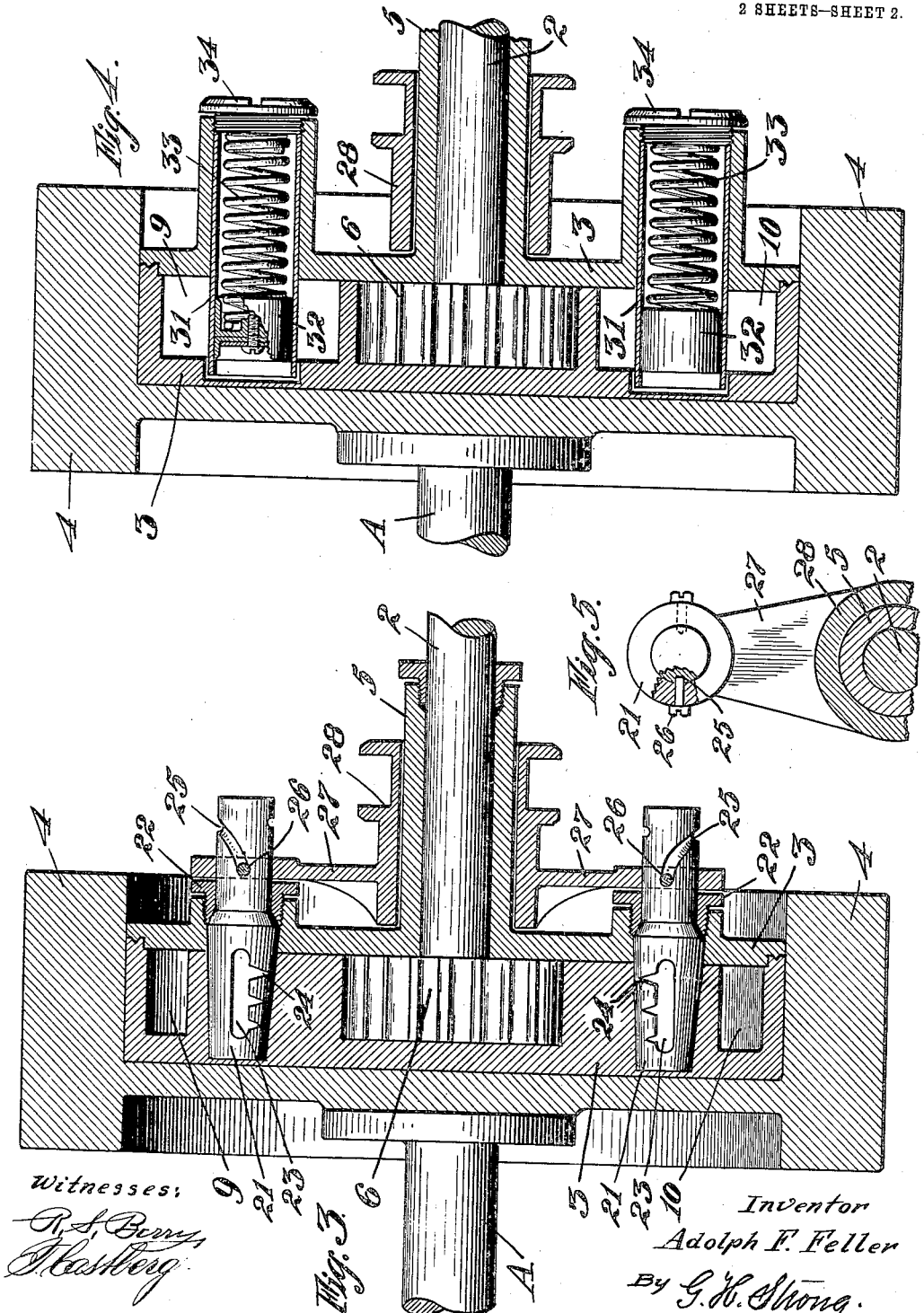

ADOLPH F. FELLER, OF BERKELEY, CALIFORNIA, ASSIGNOR OF ONE-FOURTH TO ERNEST J. BROBERG AND ONE-FOURTH TO HANS C. HANSEN, BOTH OF OAKLAND, CALIFORNIA.

COMBINED CLUTCH AND MULTIPLE TRANSMISSION.

979,272.   Specification of Letters Patent.   Patented Dec. 20, 1910.

Application filed December 2, 1909. Serial No. 531,042.

*To all whom it may concern:*

Be it known that I, ADOLPH F. FELLER, citizen of the United States, residing at Berkeley, in the county of Alameda and State of California, have invented new and useful Improvements in Combined Clutches and Multiple Transmissions, of which the following is a specification.

My invention relates to transmission mechanism, and pertains especially to a combination clutch, transmission and variable speed changing device applicable for automobiles and the like, or wherever it is desired to transmit power from a driving member to a driven member intermittently or continuously, or to run the driven member at variable or constant speed.

The primary object of the invention is to provide a mechanism of this character operative on the principle of a gear rotary pump, and the particular objects and advantages will be apparent hereinafter.

The invention consists of the parts and the construction and combination of parts as hereinafter more fully described and claimed, having reference to the accompanying drawings, in which—

Figure 1 is a sectional elevation of the invention. Fig. 2 is a cross section on the line X—X, Fig. 1. Fig. 3 is a cross section on the line Y—Y, Fig. 1. Fig. 4 is a cross section on the line Z—Z, Fig. 1. Fig. 5 is a detail in elevation of the valve actuating device.

A is a drive shaft operated from a gasolene motor or other suitable source of power, and 2 is a driven shaft adapted to be intermittently connected and disconnected with the engine or drive shaft A. The means for connecting the two shafts, or any other two elements of which shafts A and 2 may be considered equivalents, constitutes the present invention.

3 represents a gear case which, in practice, may be fastened into the concaved back wall of the gasolene motor fly-wheel 4, which is carried by the drive shaft A; the shaft A, fly wheel 4, and case 3 thus revolve in unison. The case 3 has a sleeve or hub projection 5, coaxial with shafts A and 2, forming a bearing for shaft 2, which latter projects into the gear case and carries a fixed gear 6. This fixed gear 6 on shaft 2 is designed to be in constant mesh with two gears 7, 8, inside and carried by the gear case 3. The case 3 forms a housing for the gears 6, 7, 8, and also incloses two liquid containing chambers or reservoirs 9, 10, arranged one on each side of the gears and traveling always with the gear case and drive shaft. These reservoirs or chambers are each adapted to contain a liquid, such as oil, or a mixture of oil and powdered graphite or equivalent suitable fluid.

The casing 3 comprises a flat back plate with a peripheral flange 3' adapted to fit within the recess in the fly-wheel 4; the cover-plate 3ª seating on the flange to form a tight joint and being stoutly held to the back plate by the bolts 3ᵇ—3ᶜ. This cover-plate 3ª carries the hub 5 in which the shaft 2 carrying gear 6 journals, while the gears 7 journal loose on the bolts 3ᵇ, which latter pass through the cover-plate and screw into the back plate or casing. The casing is suitably secured in the recess in the fly-wheel by the cap screws 3ᵈ. Thus it will be seen that one side of the casing 3 is flat and flush, so that it can be fitted up against a flat surface like the web of a fly-wheel; the operating parts of the clutch mechanism being all on the other side of the casing and easily accessible. The inside of the back plate of the casing 3 has a central lug or trunnion member 6' in axial line with shafts A and 2, and adapted to fit within a recess formed centrally in the end of the gear 6; a bronze collar or bushing 6ᵇ forming the bearing for the gear on this projection or stub shaft 6'. This bearing member 6' is of the utmost importance, as it forms a centering device and auxiliary support both for the gear 6 and shaft 2, since there is a tremendous thrust and strain on gear 6 and shaft 2 when the device is in operation.

The gear 7 is partially inclosed by a segmental wall 11, and gear 8 is partially inclosed by a similar segmental wall 12. Likewise gear 6 is partially inclosed on opposite sides by segmental walls 13, 14; these several wall sections 11, 12, 13, 14 being within and part of the gear case and cooperating to form the chambers 9, 10. These wall sections are approximately tangential, but out of actual frictional contact with the gears 6, 7, 8, which latter coact on the principle of a gear pump to circulate the oil back and forth between the chambers 10, 9, as will be shortly described, and it is by the control of this circulation that motion is imparted to the shaft 2 and the latter operated at any desired speed.

Assuming the shaft A and fly wheel 4 and case 3 to be revolved in the direction of the arrow $p$, Fig. 1, chamber 9 has an outlet 15 between walls 12, 14, at a point adjacent to the intermeshing teeth or nearest approach to tangency of the gears 6, 8, and similarly reservoir 10 has an outlet 16 between the walls 11, 13, proximate to the intermeshing teeth of gears 6, 7. The revolution of the gear case 3 in the direction of the arrow $p$ will cause the gears 7, 8 to rotate, as indicated by their respective arrows, and normally these gears 7, 8 will run free around the gear 6, which latter with its shaft 2 will remain stationary. By the revolution of gears 7, 8, liquid which is drawn in from reservoir 10 through the port 16 is carried around in between the teeth of gear 7, against the wall 11, and discharged at the opposite side into an intermediate or compression chamber 17, which has an outlet 18 into the reservoir 9, and likewise the liquid drawn in from chamber 9 by gear 8 through port 15 is taken around by the teeth of the gear against the wall 12 and discharged into an intermediate or compression chamber 19, which has an outlet 20 in the reservoir 10.

Each of the passages 18, 20 is controlled by a suitable valve represented at 21, and the two valves 21 are so operated in unison that they will close and open alike, and correspondingly retard, more or less, the circulation between the two chambers 9 and 10. Accordingly as the circulation is retarded the gear 6 and its shaft are made to revolve.

Each valve 21, as here shown, comprises a rotatable plug member, suitably held in position by a gasket 22. Each plug has a port 23, registrable with its respective outlet passage 18 or 20, and the walls of each port 23 have V-shaped notches 24, of diminishing depth extending laterally from the port 23 to produce a gradual cut-off or opening action of the valves as they are closed or opened. Each valve member 21 has a diagonal or spiral peripheral slot 25 on its outer end engaged by a pin 26 on the flange 27 of a collar 28, which latter is slidable lengthwise on and turnable with hub 5 of case 3. Thus it will be seen that as the sleeve 28 is pushed back and forth on the hub 5, the valves 21 are turned to close or open, and so restrict more or less the circulation of the fluid pumped by the gears from chambers 9, 10. When the valves 21 are opened, there is a free and unrestricted circulation between the reservoirs 10, 9, and as the pressure is then equalized on the opposite sides of gear 6, the latter remains stationary, and gears 7, 8 run as idle gears around gear 6. By operating valves 21 so as partly to close the passages 18, 20, the circulation of the fluid back and forth between the chambers 9, 10 is correspondingly restricted, creating a pressure in the intermediate chambers 17, 19, which will react on gear 6 to set it in motion and consequently revolving shaft 2; the speed of gear 6 and shaft 2 varying directly as the valves 21 are opened or closed more or less. If the valves 21 are entirely closed so as to cut off circulation through the passages 18 and 20, all the gears will revolve at the same rate of speed. When the valves 21 are open to their full extent and gear 6 is stationary, all the oil that is pumped is carried around the teeth of gear 7, 8 against the respective walls 11 and 12. As the valves are slowly or partly closed, and the pumping action is continued, a breaking or drag action on gear 6, due to the pressure of the confined oil or liquid in chambers 17, 19, is produced, causing the gear 6 to revolve at corresponding speed.

30 represents a Y-groove in the walls of each chamber 17, 19, having its branches terminating at the point where two teeth come together. These grooves or ducts are important because they provide avenues of escape for the liquid which would otherwise be trapped and held in the interdental spaces at this point, with the resulting tendency to render the machine inoperative or cause a drag on the center gear. These Y-grooves allow the accumulated fluid which would otherwise be compressed between the intermeshing teeth to find its way out and back into the pressure chambers. These grooves or slots 30 play a very important part in this invention, insuring absolutely a free center gear 6 when desired. Were it not for these grooves the device would always drag.

In order to provide for expansion and contraction of the contained circulating fluid due to the alternating heating and cooling of the same, and to obviate the necessity of frequent recharging of the reservoirs due to leakage or otherwise, I provide for each reservoir an automatic pressure cylinder 31, in which is a plug or plunger 32, acted upon by a spring 33; the inner end of the cylinder being in communication with its respective reservoir, and by unscrewing a plug 34 and taking out plunger 32, a reservoir may be easily charged. These stiff springs 33 act against their plugs 34 and force the plunger 32 inward always. These plungers, which have leather packing rings to prevent leaking, act with yielding force against the contained liquid so that the chambers are always practically full of liquid. By means of these pressure cylinders and their spring actuated plungers, a perfect feeding of the oil is insured. As the liquid in the reservoirs heats up, as it is bound to do when the machine is running, it expands into the cylinders, gradually pushing back the plungers 32, but does not escape from the casing. As the liquid cools and correspondingly contracts, the plungers 32 move inwardly again correspondingly and so practically maintain the reservoirs always full.

In operation the parts are assembled in the manner shown, and the drive shaft A set in motion. If the valves 21 are open, and the fluid has free circulation back and forth between the reservoirs 9 and 10 and around the gears 7, 8, the pressure on the opposite sides of gear 6 is equalized, and gear 6 remains stationary. If it is desired to start the shaft 2 in motion, the valves 21 are partly closed so as to choke more or less the circulation between the reservoirs 9 and 10, and this choking action resulting in a pressure or compression in the intermediate chambers 17, 19 reacts on gear 6 to set it in motion. If it is desired to run shaft 2 at full speed, the valves 21 are completely closed. The V-shaped notches in the walls of ports 23 allow for a gradual starting and stopping of shaft 2. The Y-shaped grooves 30 provide vents for the fluid taken into the interdental spaces by any two intermeshing teeth and obviate the undesired drag on gear 6. This transmission working as it does on a rotary pump principle permits an infinite number of variable speed changes to be made and all by means of a single operating lever acting on the collar 28.

The invention has been put into practical and successful operation, and has been severely tested under heavy overloads. Experience shows that when the valves were entirely closed, the central gear 6 revolves so nearly in unison with the casing and drive shaft that the difference is practically negligible. Also owing to the large supply of the mixture of oil and graphite which I prefer to use, due to its elasticity and mobility, there is little tendency to heat, even on a long steady run, and such expansion as there is, is readily taken care of by the expansion cylinders 31 and plungers 32. Furthermore, it is found that the thumping or knocking of the engine is absorbed by the circulating fluid and shaft 2 is run smoothly and practically without vibration. These points are all very valuable in the matter of automobile and like construction and operation.

Having thus described my invention, what I claim as new and desire to secure by Letters-Patent, is:

1. In a transmission, the combination of a casing and revoluble support therefor, said casing inclosing fluid reservoirs, a fluid clutch mechanism contained within the casing, and an expansion cylinder for each reservoir, said cylinder opening into the reservoir and being arranged substantially parallel with the axis of the casing, and a spring-pressed plunger in each expansion cylinder.

2. In a transmission, the combination of a casing, a revoluble support therefor, said casing inclosing fluid reservoirs, a fluid clutch mechanism within the casing intermediate of said reservoir, an expansion cylinder for each reservoir opening thereinto, said cylinder having its axis parallel with the axis of the revoluble support, and a spring-pressed plunger in each cylinder.

3. In a transmission, the combination of a casing, a revoluble support upon which the same is mounted, said casing inclosing fluid reservoirs, a fluid clutch mechanism in the casing between the reservoirs, said clutch comprising gears adapted to pump the fluid back and forth between the reservoirs, an expansion cylinder for each reservoir opening into the reservoir and arranged substantially parallel with the axes of the pumping gears, and a spring-pressed plunger in each cylinder.

4. The combination with a fly-wheel forming a revoluble support, of a fluid clutch comprising a casing with a cover plate, and intermeshing pumping gears, one of said gears being concentric with the axis of the fly-wheel and between the other gears, said casing having a stud projecting inwardly from the center of its rear face and said central gear having a socket to receive said stud, about which stud the gear is revoluble, screws passing through the cover plate and through said other gears and into the back of the casing, said screws serving to hold the cover plate to the casing and also serving as axes about which said other gears are turnable.

5. The combination with a fly-wheel having a recess in one end concentric with the axis of rotation of the fly-wheel, of a casing removably fitting in said recess and concentric therewith and secured to the fly-wheel, said casing comprising a back plate with a rim flange and a cover plate fitting on said rim flange, means for securing the cover plate to the back plate, partitions in the casing forming reservoirs at each side thereof, said partitions having openings communicating with the reservoirs, a fluid clutch between said partitions adapted to pump the fluid back and forth between the reservoirs, an expansion cylinder for each of the reservoirs, each of said cylinders having a spring-pressed plunger and having an opening into a reservoir and standing approximately parallel with the axis of said fly-wheel and casing whereby the centrifugal action of the fluid in the reservoirs on said plungers is minimized.

In testimony whereof I have hereunto set my hand in the presence of two subscribing witnesses.

ADOLPH F. FELLER.

Witnesses:
CHARLES EDELMAN,
C. C. COOK.